Patented May 26, 1936

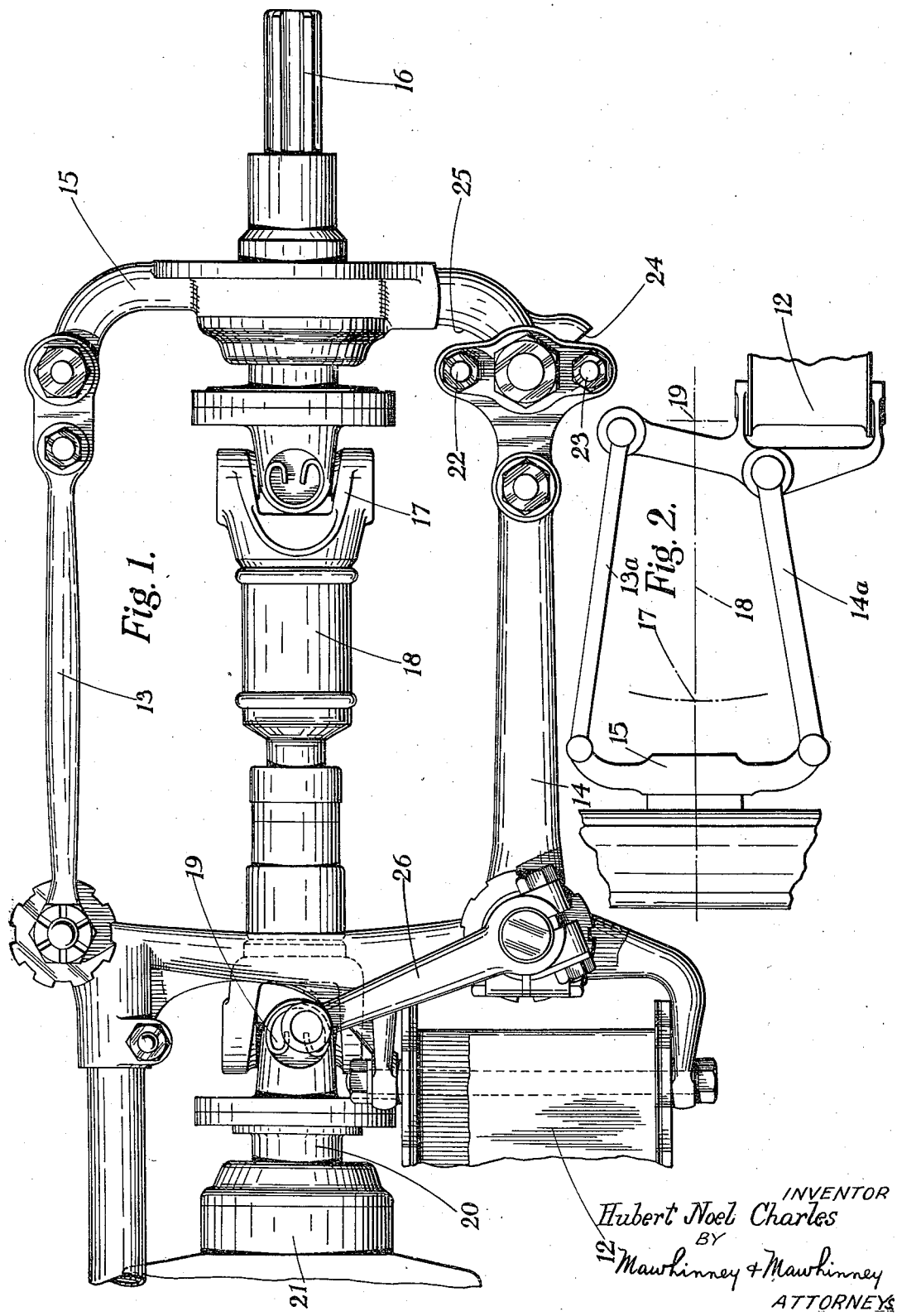

2,041,992

UNITED STATES PATENT OFFICE 2,041,992

REAR SUPPORTING AND DRIVING MEANS FOR MOTOR VEHICLES

Hubert Noel Charles, Abingdon-on-Thames, England, assignor to The M. G. Car Company Limited, Abingdon-on-Thames, England Application December 31, 1935, Serial No. 57,034
In Great Britain December 29, 1934

3 Claims. (Cl. 180—73)

This invention relates to the driven road wheels of motor-vehicles, where the suspension means of a driven road wheel comprises upper and lower links arranged transversely of the vehicle and hinged at one end to the chassis frame and at the other to the wheel support, the driving means comprising a universally-jointed transverse shaft extending from the wheel hub to an axle casing carried by the frame.

Its main object is to avoid the use of any telescopic driving connection in the driving shafts, or to reduce such telescopic movement to a minimum, even though the wheels move in parallel planes towards and away from the frame slightly as they are guided by the parallel links.

According to the invention the links are of such effective lengths and their pivotal axes are so disposed relatively to the distance between the centres of universal joints at the ends of the driving shaft, as to constrain the centre of the outer universal joint to swing in a substantially true arc about the centre of the inner universal joint.

If the links are parallel to one another and of the same effective length, a line joining the centres of the universal joints is of the same length as the effective length of either of the links, and the shaft is parallel to the links.

In the accompanying drawing:—

Figure 1 is an elevation of one construction according to the invention, as applied to the driven road wheel of a motor-vehicle; and Figure 2 is a somewhat diagrammatic elevation of an alternative construction.

In the construction illustrated by Figure 1, there are hinged one above the other to the chassis frame 12, or rather to brackets secured thereto, two parallel links 13, 14 of identical length. These are preferably of triangular skeleton form or V-shaped in plan. The outer ends of these are hinged to the brake anchor plate or other support 15 which carries the bearings for the driving hub 16 of the road wheel. Any kind of spring arrangement may be used to hold the links approximately horizontal and the wheel vertical when the vehicle is normally loaded.

Through the support 15 projects part of the hub which is connected by a substantial universal joint 17 of the mechanical type with a short driving shaft 18. The other end of the shaft is similarly universally jointed at 19 with a short driving spindle 20 projecting from the axle casing 21 which is secured to the chassis frame. The driving shaft is parallel to the links and a line from the centre of one joint to the centre of the other is of exactly the same length as that of a line joining the pivotal axis at one end of a link to the pivotal axis at the other end thereof.

Thus the two parallel links and the short shaft on each side can swing up and down without any necessity for a sliding driving connection in the shaft, which is liable to seize up under the heavy torque passing through it. The centre of the outer joint 17, in fact, describes a true arc about the centre of the inner joint 19.

If desired rubber buffers or stops may be mounted on or from the chassis frame to limit the rise and fall of the links. In the present instance the lower wishbone 14 carries adjacent the wheel support 15, upper and lower bolts or other pins 22, 23 each of which is lined with a rubber sleeve. When the road wheel rises relatively to the frame the face 24 of the support 15 co-acts with the lower pin 23 to limit such movement. When the road wheel falls the face 25 of the support co-acts with the upper pin 22 to limit such movement.

Figure 1 shows a crank 26, movable with the lower link 14, which may be connected to a shock absorber.

It should be noted that it is not essential that the centres of the universal joints should be in the vertical planes of the pivots of the links, as long as the driving shafts are parallel to the links and are of the lengths stated.

In the modification of Figure 2, with which there is less tendency for roll to be set up, the upper and lower links 13a, 14a, interconnecting the chassis frame 12 and the wheel support 15, are not parallel to one another and are not of equal lengths; but they are so arranged, relatively to the driving shaft 18, that the centre of the outer universal joint 17 moves in a substantially true arc about the centre of the inner joint 19 as the road wheel rises or falls relatively to the chassis frame.

What I claim as my invention and desire to secure by Letters Patent of the United States is:—

1. In a motor-vehicle chassis frame, a bracket bolted to and extending above the chassis frame, a support for a driven road-wheel also above the chassis frame, upper and lower transverse links hinged at their inner ends to the bracket and at their outer ends to the wheel support, the upper link being above the chassis frame and the lower at the level thereof, a transverse driving shaft above the level of the chassis frame, and universal joints at the ends of said driving shaft, the effective lengths of the links and the disposition of their pivotal axes relatively to the distance between the centres of said universal joints being such as to constrain the centre of the outer universal joint to swing in a substantially true arc about the centre of the inner universal joint.

2. In a motor vehicle chassis frame, a bracket bolted to the frame and extending from a point below the top of the frame to a point above the top of the frame, a support for a driven road wheel also above the chassis frame, an upper transverse link hinged at its inner end to the upper end of the bracket, a lower transverse link hinged at its inner end to the lower end of the bracket, means for hingedly securing the outer ends of the links to the wheel support, a transverse driving shaft above the level of the chassis frame, and universal joints at the ends of said driving shaft, the effective lengths of the links and the disposition of their pivotal axes relatively to the distance between the centres of said universal joints being such as to constrain the centre of the outer universal joint to swing in a substantially true arc about the centre of the inner universal joint.

3. In a motor vehicle chassis frame, a bracket bolted to the frame and extending from a point substantially coplanar with the vertical centre of the frame to a point above the top of the frame, a support for a driven road wheel also above the chassis frame, an upper transverse link hinged at its inner end to the upper end of the bracket, a lower transverse link hinged at its inner end to the lower end of the bracket, means for hingedly securing the outer ends of the links to the wheel support, a transverse driving shaft above the level of the chassis frame, and universal joints at the ends of said driving shaft, the effective lengths of the links and the disposition of their pivotal axes relatively to the distance between the centres of said universal joints being such as to constrain the centre of the outer universal joint to swing in a substantially true arc about the centre of the inner universal joint.

HUBERT NOEL CHARLES.